United States Patent [19]

Robertson et al.

[11] Patent Number: 5,129,201
[45] Date of Patent: Jul. 14, 1992

[54] FIRE SAFETY DEVICE

[75] Inventors: Eric B. Robertson, Bradenton; John C. Ibasfalean, Cortez, both of Fla.

[73] Assignee: National Improvement Company, Inc., Cortez, Fla.

[21] Appl. No.: 640,731

[22] Filed: Jan. 14, 1991

[51] Int. Cl.⁵ .............................................. E04H 9/00
[52] U.S. Cl. ...................................... 52/232; 52/317; 52/221
[58] Field of Search ........................ 52/232, 317, 221

[56] References Cited

U.S. PATENT DOCUMENTS

| | | |
|---|---|---|
| 4,424,867 | 1/1984 | Mallow ................................. 52/221 |
| 4,538,389 | 9/1985 | Heinen ................................. 52/232 |
| 4,642,956 | 2/1987 | Harbeke . |
| 4,848,043 | 7/1989 | Harbeke ................................ 52/232 |
| 4,850,385 | 7/1989 | Harbeke . |
| 4,882,886 | 11/1989 | Harbeke . |
| 4,888,925 | 12/1989 | Harbeke . |
| 4,916,800 | 4/1990 | Harbeke . |
| 4,918,761 | 4/1990 | Harbeke . |

OTHER PUBLICATIONS

Metaline Metacaulk Brochure 07270/MET (four pages).
Product Data Sheet Metacaulk Brochure 950 Fire Stopping Penetration Sealant (Jan. 1990).
Brochure from Fox Couplings entitled "Product Data 'SLV' PVC Fire Stop Sleeve".
Brochure from Fox Couplings entitled "Product Data 'CIP' Cast-In-Place PVC Firestop Coupling".

Primary Examiner—David A. Scherbel
Assistant Examiner—Wynn E. Wood
Attorney, Agent, or Firm—Browdy and Neimark

[57] ABSTRACT

A fire safety device for closing through-holes in floors and walls and for thus stopping the potential spread of fire and smoke in case of the occurrence of a fire, includes a section of pipe having a weakened wall, a cup-shaped retainer spaced from the outside surface of the pipe section so as to define an annular space therebetween, the annular space in turn being provided with a suitable and pre-measured quantity of intumescent material. The device is pre-fabricated and thus avoids the problems inherent in attempting to manually provide the intumescent material in a collar during construction.

18 Claims, 1 Drawing Sheet

FIRE SAFETY DEVICE

FIELD OF INVENTION

The present invention relates to a fire safety device, and more particularly a device used in construction for closing or sealing through-holes in floors and walls and for thus stopping the spread of fire and smoke.

BACKGROUND OF THE INVENTION

It is now common practice, and it has been for many years, to build commercial buildings of reinforced concrete. Even when buildings are made from structural steel, it is common for the floors between stories to be formed of cast concrete or other fire resistant materials. Even if floors and separating walls are made from materials other than concrete, fire stopping is required by model building codes to prevent a fire from passing through the floor or walls, in order to prevent the spread of fire and to prevent destructive heat and toxic combustion products from spreading dangerously throughout a building.

On the other hand, it is necessary for there to be through-openings in such floors and walls so that electrical wiring and pipes of various types can pass through such floors and walls. The provision of such openings for pipings of various types to pass through walls and floors of course creates problems insofar as the building codes are concerned, because these openings can permit passage therethrough of fire and/or smoke upon destruction of the piping which normally passes through these openings. Therefore, modern building codes require that when a fire or smoke rated floor is penetrated, it must be restored to its original integrity. Penetration can occur when the type of penetrating material, which may be metal, plastic, insulated or glass pipe, insulated cable, etc. is destroyed by a fire.

Model building codes, including the Standard Building Code, emphasize "approved methods" for fire stopping in such situations, such "approved methods" having been tested using nationally recognized standards at a recognized independent third party testing laboratory, such as Underwriters Laboratories, Factory Mutual, etc. As a result, certain manufacturers (such as the 3M Company and Metaline Company) have developed certain intumescent compositions which may be dispensed from a tube (such as caulking material is dispensed) for injection into and around openings passing through fire rated walls and floors and outside the pipes which also pass through such openings. The theory is that under severe fire exposure which results in destruction of the piping material and consequent spread of smoke, heat and/or fire through the entire opening, the intumescent material will expand and completely fill the void and thereby restore the integrity of the floor or wall, thereby at least inhibiting the spread of fire and smoke.

In practice, however, it is difficult and time consuming to apply such intumescent material from a caulking gun; and, moreover, because the application is done manually it varies from location to location and even more so among different applicating personnel, so that in many cases the application is not adequate. Another problem in this prior art is the leakage of expanding intumescent material upon being subjected to fire or the heat generated by the fire; even where metallic collars are manually wrapped about the joint to contain the intumescent material, these collars cannot be applied sufficiently tightly to prevent leakage of the expanding intumescent material from the joint. As a result, insufficient expanded intumescent material may remain in the opening to adequately perform its intended function of restoring the integrity of the floor or wall.

SUMMARY OF THE INVENTION

It is, accordingly, an object of the invention to overcome deficiencies of the prior art, such as indicated above.

It is another object of the present invention to provide for increased safety in building construction and to inhibit the potential spread of fires and smoke in newly constructed buildings and in retrofitted buildings as well.

It is a further object of the present invention to provide a device for closing holes in ceilings and floors (hereinafter "floors") and walls especially, and for inhibiting the spread of fire and smoke from one floor to another.

It is still another object of the present invention to provide a system for stopping the spread of fire and smoke, which system is less expensive because it eliminates manual application of intumescent material, and is safer and more effective because it provides for a measured and uniform amount of intumescent material on a consistent basis.

It is still a further object of the present invention to provide a pre-manufactured device containing a predetermined relatively precise quantity of intumescent material, which is easily installed by the builder, and which prevents leakage of intumescent material and ensures effective restoration of floor and wall integrity in the event of fire.

It is yet another object of the present invention to provide an improved fire safety device which has an auxiliary function of supporting pipes, and therefore provides the additional advantage of eliminating the need for conventional pipe hangers.

These and other objects are achieved according to the present invention by the use of a composite product including a section of pipe optionally having a weakened wall portion, a retainer of suitable shape capped by a cover disc surrounding the pipe and held in a uniformly spaced manner by suitable spacer or guide means to create a generally confined space between the pipe section and the retainer, and a properly measured quantity of intumescent composition retained within the confined space between the retainer about the exterior of the pipe, so that when the pipe is subjected to intense heat generated by a fire causing destruction or partial destruction of the pipe, the retainer becomes heated and intumescent material foams and expands causing collapse of the pipe wall where necessary and entirely filling the space previously occupied by the pipe so as to restore the wall or floor into which the pipe section has been placed to its original fire stopping integrity.

BRIEF DESCRIPTION OF DRAWING

Other objects and the nature and advantages of the present invention will be more apparent from the following detailed description of a specific embodiment taken in conjunction with the drawing wherein.

DETAILED DESCRIPTION OF EMBODIMENTS

Figure 1:
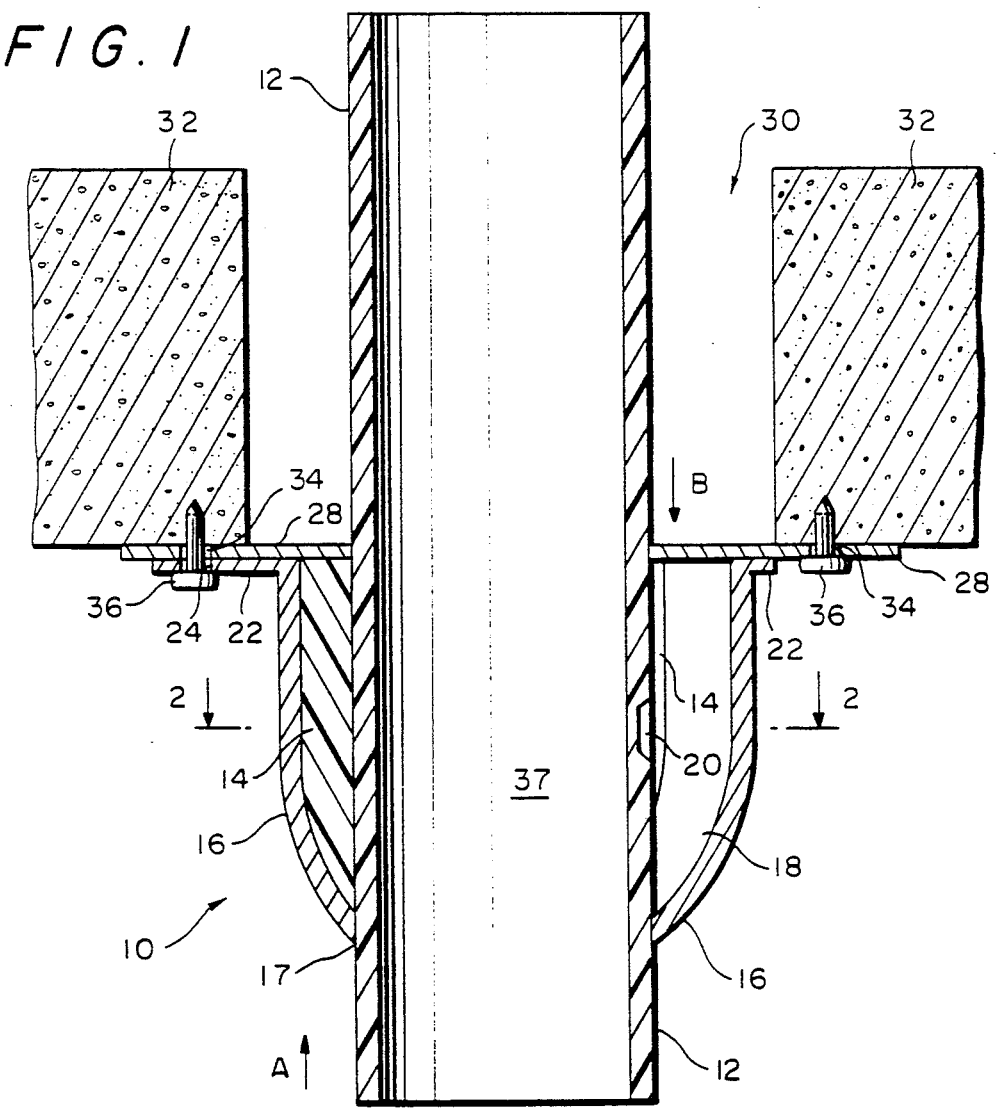
FIG. 1 is a longitudinal sectional view taken through a device in accordance with the present invention.

A device 10 according to the present invention comprises a section 12 of standard vinyl tubing or pipe having a plurality of spacer or guide fins 14 extending radially outwardly from its outer surface and surrounded by a cup-shaped retainer 16 spaced a uniform distance from the outer surface of the pipe section 12 so as to provide a confined and generally annular space 18 between the exterior of the pipe 12 and the interior of the cup-shaped retainer 16 into which is provided a suitable intumescent material 26 such as one of the types provided by 3M Company or Metaline Company. The confined space need not be annular in the sense of its outside configuration, e.g. the wall of the retainer 16 may have a cross-section other than circular.

The pipe 12, while constituting conventional PVC piping in the illustrated embodiment, may actually be formed of any suitable material. After the device 10 is put into place in or more preferably adjacent a wall or floor 32 as illustrated in FIG. 1, it will be understood that other sections of pipe provided by the builder are attached at the top and bottom of the pipe section 12 by conventional coupling means, such as nipples, heat welding, etc.

In accordance with the present invention it is preferred that a series of weakened portions 20 be provided in the wall of the pipe section 12. In the illustrated embodiment of the device 10, these weakened portions 20 are merely a plurality of indentations, here three being illustrated, spaced approximately 120° from each other. The provision of such weakened portions 20 in one or more desired locations ensures that when fire strikes causing sufficient heat to begin the destruction of the pipe section 12 and expansion of intumescent fire retarding composition, such expanding intumescent material will cause collapse of the wall of the pipe section 12 in the location of the weakened portion(s) 20 so as to fill the interior 37 of the pipe section 12 to ensure restoration of the integrity of the wall or floor through which the pipe section 12 projects.

As noted above, the exterior of the pipe section 12 is provided with suitable spacing or guiding means, these being in the form of a plurality of outwardly projecting fins 14 in the illustrated device 10, most preferably three fins 14 as illustrated, these desirably being spaced at 120° from one another as also illustrated. The fins 14 are desirably formed of suitable plastic, preferably vinyl plastic, and are adhered such as by adhesive or heat welding to the outside surface of the pipe section 12, or the pipe section 12 with suitable spacers can be injection molded in one piece. Other spacer means can be used instead of the fins 14.

In contact with the outside edges of the spacer fins 14 is the cup-shaped retainer 16, preferably formed of sheet metal, and most preferably a seamless sheet metal stamping. The cup-shaped retainer 16 preferably has a plurality of ears or radially outwardly extending flanges 22 at its upper end. In the illustrated embodiment, there are provided three of such outwardly extending radial flanges or ears 22, these being desirably spaced 120° from one another. A hole 24 may be provided in each of such flanges or ears 22 for attachment such as by screws or T-nails of the cup-shaped retainer 16 to a wall surface or a floor. It will be understood that in order to assemble the cup-shaped retainer 16 over the guiding or spacing fins 14 of the pipe section 12, it is only necessary to insert the retainer 16 over the bottom of the pipe section 12 in the direction of the arrow A as shown in FIG. 1.

As the cup-shaped retainer 16 is spaced away, from the outside wall of the pipe section 12 in all locations, except that its very bottom annular edge 17 which tightly hugs the outside wall of the pipe section 12 in such a way as to prevent leakage of hot intumescent therebetween, it will be understood that the annular space 18, which in the illustrated embodiment 10 is in the form of three segregated chambers 18, is created in which to place a suitable intumescent material 26 such as one of those presently commercially available, e.g. 3M Brand Caulk CP 25 as disclosed in the 3M Firestopping Brochure 07270, a copy of which is attached, or Metaline Metacalk as disclosed in the Metaline Brochure 07270, copy attached. For purposes of illustration, only one of the chambers 18 in FIG. 2 is illustrated as containing such intumescent material 26, it being understood that in practice the entire annular space 18 between the cup-shaped retainer 16 and the exterior of the pipe section 12 will be so filled with intumescent material 26.

As part of the present device there is also provided an annular cover disk 28, already attached to the retainer 16 such as by welding or adhesive, also preferably made of sheet metal and provided with suitable holes 34 for the passage therethrough of suitable anchoring means such as screws or T-nails 36. The annular cover disk 28 is applied after filling the annular space or spaces 18 with the intumescent material 26 by merely sliding same over the top of the pipe section 12 in the direction of arrow B. The cover disk 28, like the retainer 16, need not be annular in the sense of its outer configuration, i.e. its outer edge may be of a shape other than circular.

Figure 2:
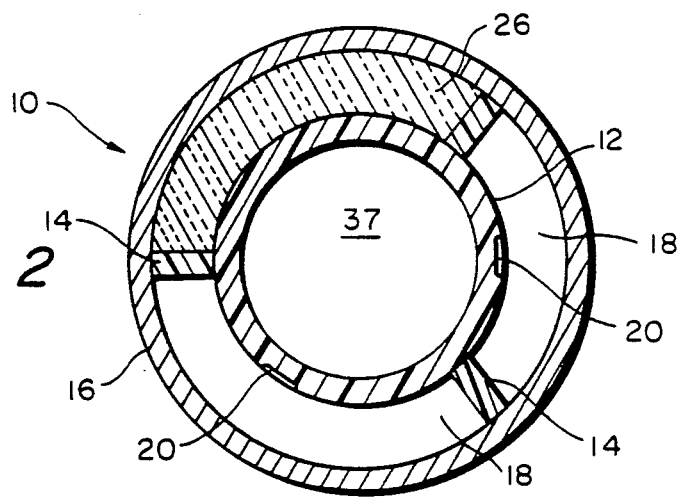
FIG. 2 is a sectional view taken along line 2—2 of FIG. 1.

The device of the present invention, such as the illustrated embodiment 10 of FIGS. 1 and 2, is provided as a prefabricated unit to the builder, who then merely needs to place it in or preferably adjacent a hole 30 in the direction of arrow A in a fire barrier wall or floor 32 as illustrated in FIG. 1. If desired and as preferred, the unit 10 is anchored to the wall or floor 32 by nails such as T-nails 36, screws or the like passing through the holes 24 in the ears or flanges 22 and/or holes 34 in the cover disk 28. As indicated above, after installation of the unit 10, the ends of the pipe section 12 are merely connected to other pipe sections using conventional technology; conventional pipe hangers are eliminated because the piping system is held in place by the unit 10 attached to the wall or floor 32 by the screws or nails 36.

The device of the present invention remains in place within a building in its illustrated form until such a time as a fire occurs. When the temperature reaches a certain elevation which is determined by the nature of the intumescent material 26, such intumescent material begins to expand. As it has nowhere to go except inwardly against the wall of the pipe section, and further as the upper end of the cup-shaped retainer 16 is closed by the disk 28, and further as the pipe section 12 may be weakened by indentations 20 and in any event has become weakened or has even begun to melt because of the fire and/or the heat generated by the fire, the intumescent material expands inwardly and seals the interior space 37 of the pipe section 12.

It will be understood that the intumescent material 26 can only expand inwardly because the metal retainer 16 and the cover disk 28 prevent expansion outwardly and upwardly. The cover disk 28 also assists in preventing the spread of fire by sealing the periphery of the opening 30 through which the pipe passes. It will be understood that the intumescent material 26 is capable of expanding five to ten times its original size when exposed temperatures from 250°-350° F., and upon expansion forms a high strength insulating char that totally fills the opening 37 in the pipe section 12.

It will also be understood that the product 10 of the present invention may be provided in various sizes in order to fit various size holes and pipes which may be provided in walls and floors. Other materials can be used in place of those described above in relation to the illustrated embodiment, different types of retainers can be used and different types of spacers can also be used in order to properly space the retainer from the outside of the pipe section in order to create a cavity of generally uniform size. If desired, although same is not preferred, the retainer 16 can be placed within the opening 30 in the floor 32 or wall. Also, if the unit 10 is disposed as preferred and as shown in FIG. 1, a second retainer 20 containing intumescent material can be placed against the opposite wall of the floor or wall for enhanced fire protection.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A fire safety device for use in construction to seal an opening in a fire or smoke rated floor or wall to restore integrity of the floor or wall upon the occurrence of a fire, comprising:
    a hollow conduit section having an exterior wall having at least one weakened portion along a part of the length thereof;
    a retainer surrounding said hollow conduit section and having a portion spaced therefrom to create a confined space between said hollow conduit section exterior surface and said retainer, said retainer having first and second ends, said second end having an edge tightly conforming to said exterior surface of said hollow conduit section;
    spacer means for maintaining said first end of said retainer generally uniformly spaced from said hollow conduit section so that said confined space is of generally uniform size about said hollow conduit section;
    a pre-selected quantity of intumescent material within the confined space between said retainer and said hollow conduit section exterior surface, and adjacent said weakened part; and
    a cover disk means for preventing escape of hot intumescent material from the confined space between said retainer and said hollow conduit section near said first end of said retainer.

2. A device according to claim 1 wherein said weakened portion is an indentation in the exterior surface of said pipe section.

3. A fire safety device for use in construction to seal an opening in a fire or smoke rated floor or wall to restore integrity of the floor or wall upon the occurrence of a fire, comprising:
    a hollow conduit section having an exterior wall having at least one weakened portion along a part of the length thereof;
    a retainer surrounding said hollow conduit section and having a portion spaced therefrom to create a confined space between said hollow conduit section exterior surface and said retainer, said retainer having first and second ends, said second end having an edge tightly conforming to said exterior surface of said hollow conduit section;
    spacer means for maintaining said first end of said retainer generally uniformly spaced from said hollow conduit section, such spacer means comprising a plurality of radially outwardly extending guide fins;
    a pre-selected quantity of intumescent material within the confined space between said retainer and said hollow conduit section exterior surface, and adjacent said weakened part; and
    a cover disk means for preventing escape of hot intumescent material from the confined space between said retainer and said hollow conduit section near said first end of said retainer.

4. A device according to claim 3 wherein said guide fins extend outwardly from the exterior surface of said pipe section.

5. A fire safety device for use in construction to seal an opening in a fire or smoke rated floor or wall to restore integrity of the floor or wall upon the occurrence of a fire, comprising:
    a hollow conduit section having an exterior surface;
    a cup-shaped retainer surrounding said hollow conduit section and having a portion spaced therefrom to create a confined space between said hollow conduit section exterior surface and said retainer, said retainer having first and second ends, said second end having an edge tightly conforming to said exterior surface of said hollow conduit and said first end having a plurality of radially extending ears projecting therefrom;
    spacer means for maintaining said first end and said spaced portion of said retainer generally uniformly spaced from said pipe section;
    a pre-selected quantity of intumescent material within the confined space between said retainer and said pipe section exterior surface; and
    a cover disk means for preventing escape of hot intumescent material from the confined space between said retainer and said hollow conduit section near said first end of said retainer, said cover disk means comprising an annular plate having an outside diameter which extends radially beyond the ends of said ears.

6. A device according to claim 5 wherein said annular cover disk has anchoring openings passing therethrough.

7. A fire safety device for use in construction to seal an opening in a fire or smoke rated floor or wall to restore integrity of the floor or wall upon the occurrence of a fire, comprising:
    a hollow conduit section having an exterior surface and at least one weakened portion;
    a retainer surrounding said conduit section and having a portion spaced therefrom to create a confined space between said conduit section exterior surface and said retainer, said retainer having first and second ends, said second end having an edge tightly conforming to said exterior surface of said conduit section;

a pre-selected quantity of intumescent material within the confined space between said retainer and said conduit section exterior surface adjacent said weakened portion; and a cover disk means for preventing escape of hot intumescent material from the confined space between said retainer and said conduit section near said first end of said retainer.

8. A device according to claim 7 wherein said weakened portion is an indentation in the exterior surface of said pipe section.

9. A fire safety device for use in construction to seal an opening in a fire or smoke rated floor or wall to restore integrity of the floor or wall upon the occurrence of a fire, comprising:

a hollow conduit section having an exterior surface;

a retainer surrounding said conduit section and having a portion spaced therefrom to create a confined space between said conduit section exterior surface and said retainer, said retainer having first and second ends, said second end having an edge tightly conforming to said exterior surface of said conduit section;

a pre-selected quantity of intumescent material within the confined space between said retainer and said conduit section exterior surface; and a cover disk means for preventing escape of hot intumescent material from the confined space between said retainer and said conduit section near said first end of said retainer, said cover disk means comprising an annular plate having an anchoring opening passing therethrough, said plate being attached to said retainer by welding or adhesive.

10. A fire safety device for use in construction to seal an opening in a fire or smoke rated floor or wall to restore integrity of the floor or wall upon the occurrence of a fire, comprising:

a hollow conduit section having an exterior surface;

a metal retainer surrounding said conduit section and having a portion spaced therefrom to create a confined space between said conduit section exterior surface and said retainer, said retainer having first and second ends, said second end having an edge tightly conforming to said exterior surface of said conduit section;

a pre-selected quantity of intumescent material within the confined space between said retainer and said conduit section exterior surface; and a cover disk means for preventing escape of hot intumescent material from the confined space between said retainer and conduit pipe section near said first end of said retainer, said cover disk means comprising an annular metal plate sealed to said retainer by welding or adhesive.

11. A device according to claim 10 wherein said retainer is cup-shaped and has a plurality of radially extending ears at said first end.

12. A device according to claim 11 wherein each of said ears has an anchoring hole extending therethrough.

13. A device according to claim 10 wherein said retainer is cup-shaped and comprises a seamless sheet metal stamping.

14. A device according to claim 10 wherein said retainer is cup-shaped and comprises a gently curved wall defining a large opening at said first end and a small opening at said second end.

15. A device according to claim 10 wherein said cover disk means has anchoring openings passing therethrough.

16. A device according to claim 10 wherein said pipe section is formed of vinyl plastic.

17. A fire safety device for use in construction to seal an opening in a fire or smoke rated floor or wall to restore integrity of the floor or wall upon the occurrence of a fire, comprising:

a hollow conduit section having an exterior surface:

a retainer surrounding said conduit section and having a portion spaced therefrom to create a confined space between said conduit section exterior surface and said retainer, said retainer having first and second ends, said second end having an edge tightly conforming to said exterior surface of said conduit section;

a pre-selected quantity of intumescent material within the confined space between said retainer and said conduit section exterior surface; and a cover disk means for sealing the confined space and preventing escape of hot intumescent material from the confined space between said retainer and said conduit section near said first end of said retainer, said cover disk means comprising an annular plate of metal sealed to said retainer.

18. A fire safety device sealing an opening in a fire or smoke rated floor or wall to restore integrity of the floor or wall upon the occurrence of a fire, comprising:

a standard, single wall thickness plastic conduit extending through a fire or smoke rated floor or wall, said plastic conduit having an exterior surface;

a pre-selected quantity of intumescent material surrounding and directly adjacent said plastic conduit exterior surface;

retaining means for retaining and confining said pre-selected quantity of intumescent material against said plastic conduit exterior surface and for preventing expansion of said intumescent material in any direction except inwardly against said plastic conduit, said retaining means comprising a metal retainer surrounding said plastic conduit and having a portion spaced therefrom to create a confined space between said plastic conduit exterior surface and said retainer in which said pre-selected quantity of intumescent material is retained, said metal retainer having first and second ends, said second end having an edge adjacent and conforming to said exterior surface of said plastic conduit, and a metallic cover disk sealing the confined space and preventing escape of hot intumescent material therefrom.

* * * * *